United States Patent [19]

Booth et al.

[11] 4,315,639
[45] Feb. 16, 1982

[54] PASSIVE SEAT BELT SYSTEM

[75] Inventors: Frederick C. Booth, Birmingham; Richard L. Frantom, Richmond; Rudy V. Thomas, Sterling Heights, all of Mich.

[73] Assignee: Allied Corporation, Morris Township, Morris County, N.J.

[21] Appl. No.: 168,852

[22] Filed: Jul. 14, 1980

[51] Int. Cl.³ .............................................. B60R 21/10
[52] U.S. Cl. .................................................. 280/803
[58] Field of Search ................ 280/803, 802, 808, 804

[56] References Cited

U.S. PATENT DOCUMENTS

| | | |
|---|---|---|
| 3,684,310 | 8/1972 | Weststrate ........................... 280/804 |
| 3,915,472 | 10/1975 | Lindblad ............................. 280/803 |
| 4,040,645 | 8/1977 | Giffen et al. ........................ 280/803 |
| 4,138,142 | 2/1979 | Wizz ................................... 280/803 |
| 4,181,326 | 1/1980 | Hollowell et al. .................. 280/803 |
| 4,211,430 | 7/1980 | Fancy .................................. 280/802 |
| 4,235,455 | 11/1980 | Collins et al. ...................... 280/803 |

Primary Examiner—Robert R. Song
Attorney, Agent, or Firm—Roger H. Criss

[57] ABSTRACT

A passive seat belt system having a door mounted seat belt retractor in which a vehicle sensitive sensor, preferably mounted in the retractor, is mounted at a forward position on the door so that the acceleration acting on the sensor due to normal door opening motion is less than the lock up acceleration.

17 Claims, 7 Drawing Figures

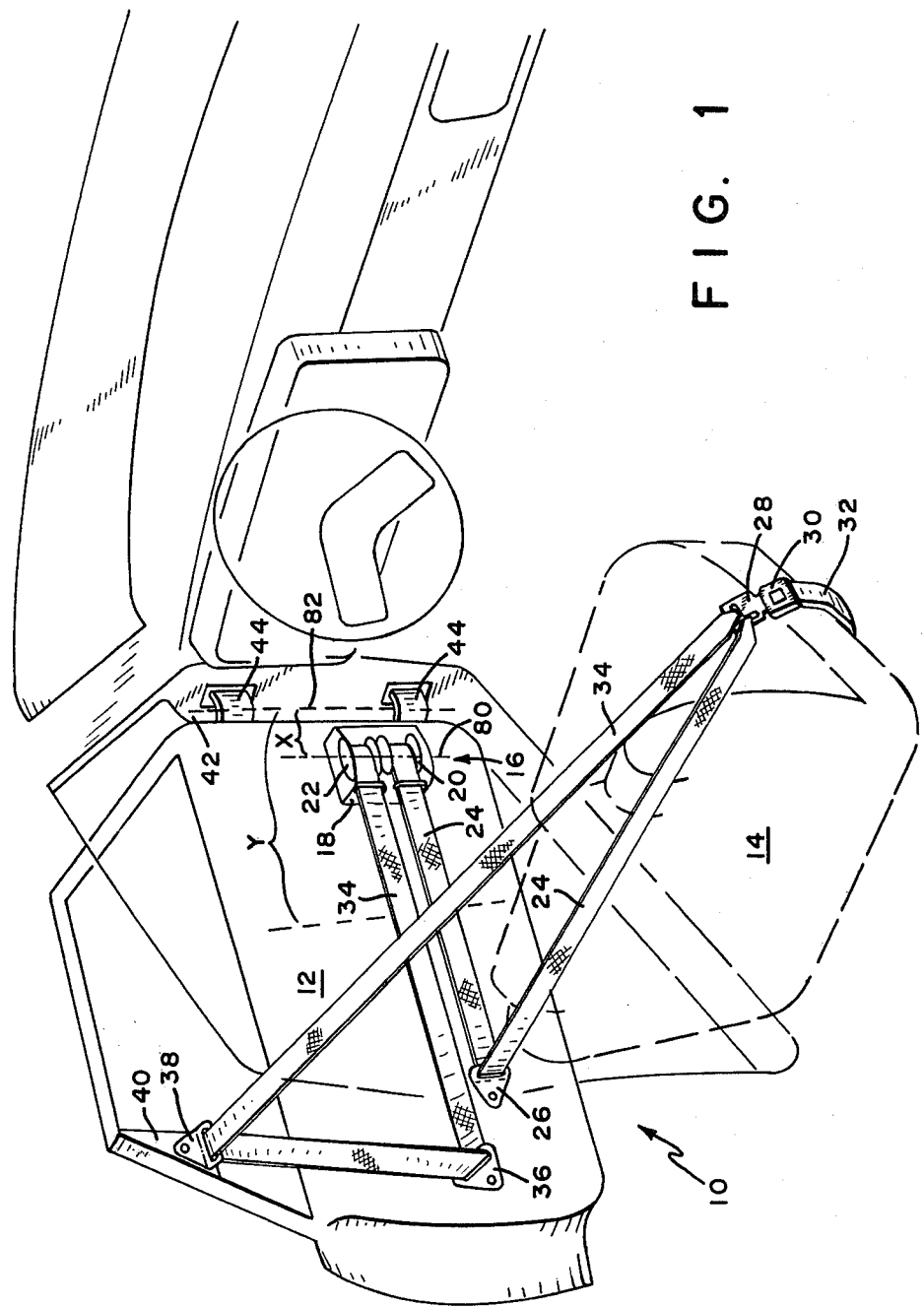

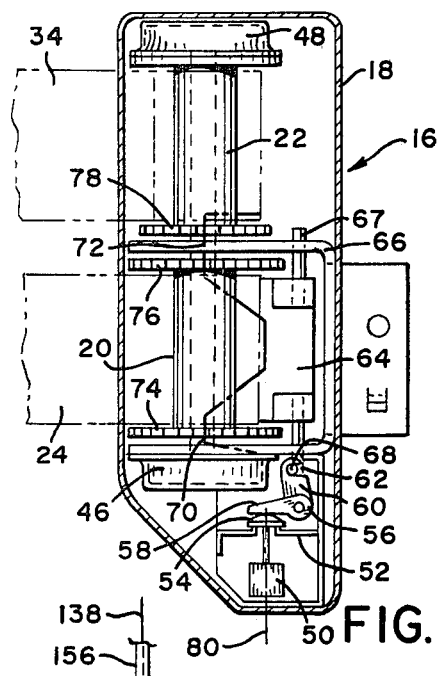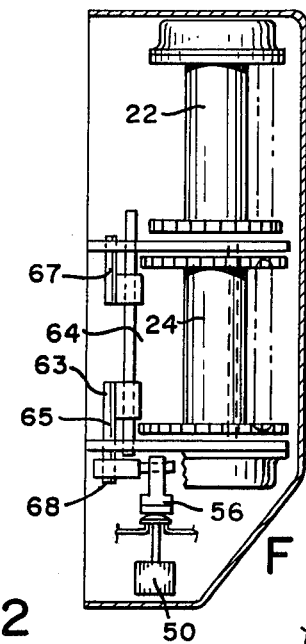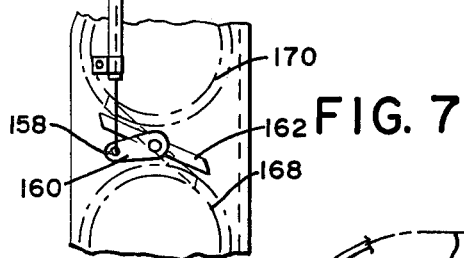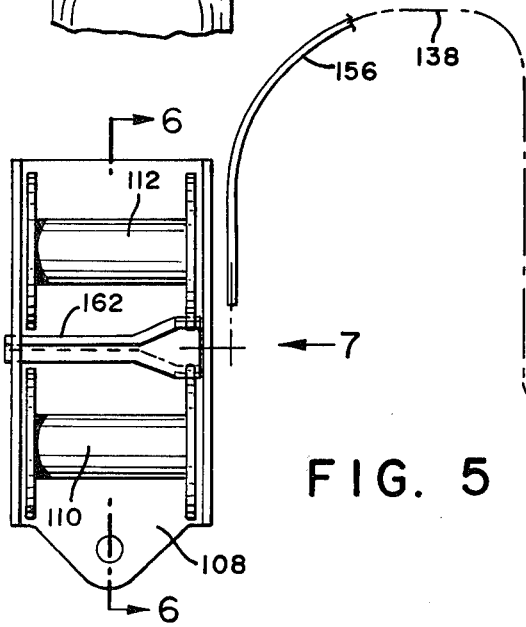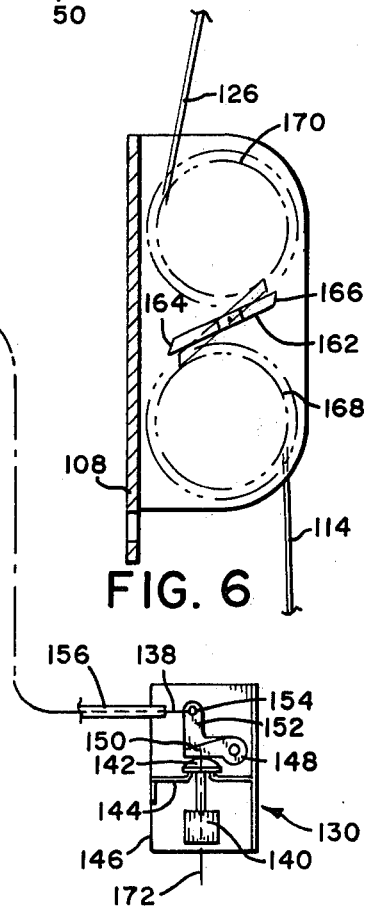

PASSIVE SEAT BELT SYSTEM

DESCRIPTION

BACKGROUND OF THE INVENTION

1. Field of the Invention

This invention relates to a passive seat belt system including means to prevent inadvertent lock up of seat belt retractors.

2. Description of the Prior Art

In certain proposed passive seat belt systems which have vehicle sensitive seat belt retractors mounted on a vehicle door, devices have been proposed to deactivate the retractor lock up mechanism whenever the door is opened. See, for example, U.S. Pat. No. 4,181,326. This has been necessary, as the accelerations generated by the door motion at the conventional retractor locations exceed the mandated lock up accelerations of the retractor. In such passive seat belt systems a lock up of the retractor during door opening would disallow further door motion as the webbing is conventionally attached to the vehicle structure adjacent the midpoint of the vehicle. Such deactivating mechanisms add undesirable cost and complexity to the system and may create certain hazards. Failure of the device to disengage when the door is closed might prevent the retractor from locking when the vehicle is exposed to crash decelerations. This type of incident would leave the occupant unrestrained and subject to injuries. It would be desirable to provide a means of allowing the vehicle doors to be freely opened without compromise to the retractor's ability to properly lock up when exposed to decelerations created by rapid stops or crash incidents (such as greater than 0.7 g in the U.S.).

SUMMARY OF THE INVENTION

In accordance with this invention, there is provided a passive seat belt system provided in a vehicle having a door adjacent to a vehicle seat, the door having a forward end hingedly connected at a hinge point to the vehicle frame, the system comprising:

at least one retractor mechanism fixedly mounted on the door;

a seat belt restraint having one end connected to the retractor mechanism and an opposite end attached to the vehicle at a position located on the inboard side of the seat, the restraint being movable towards and away from the retractor, the restraint providing a safety restraint for an occupant seated in the seat when the door is closed; and a sensor operatively associated with the retractor mechanism and operable upon sensing a deceleration or acceleration of the vehicle above a predetermined amount to lock the retractor mechanism and prevent motion of the restraint away from the retractor mechanism, at least the sensor being mounted at a position on the door adjacent the one end of the door, such position being located no further from the hinge point of the door than a predetermined distance at which the "g" forces associated with the opening of the door are less than the predetermined amount of deceleration or acceleration, whereby the sensor is not actuated to lock the retractor mechanism upon normal opening motion of the door.

Preferably, the sensor is located within a housing for the retractor mechanism and the housing is located at the aforesaid position on the door.

The present invention thus provides a relatively simple and inexpensive manner of preventing inadvertent lock up of the retractor mechanism for door mounted retractor systems during normal door opening and closing motions since the sensor is not subjected to high accelerations or "g" forces due to its location on the vehicle door.

BRIEF DESCRIPTION OF THE DRAWINGS

FIG. 1 is a perspective view of a preferred embodiment of the seat belt system of the invention.

FIG. 2 is a plan view of the retractor shown in FIG. 1.

FIG. 3 is a cross-sectional view of the retractor of FIG. 2.

FIG. 5 is a plan view of the retractor and sensor assembly of FIG. 4.

FIG. 6 is a cross-sectional view of the retractor of FIG. 5 taken along line 6-6.

FIG. 7 is a partial cross-section view of the retractor of FIG. 5 taken along arrow 7.

DESCRIPTION OF THE PREFERRED EMBODIMENTS

Figure 4:
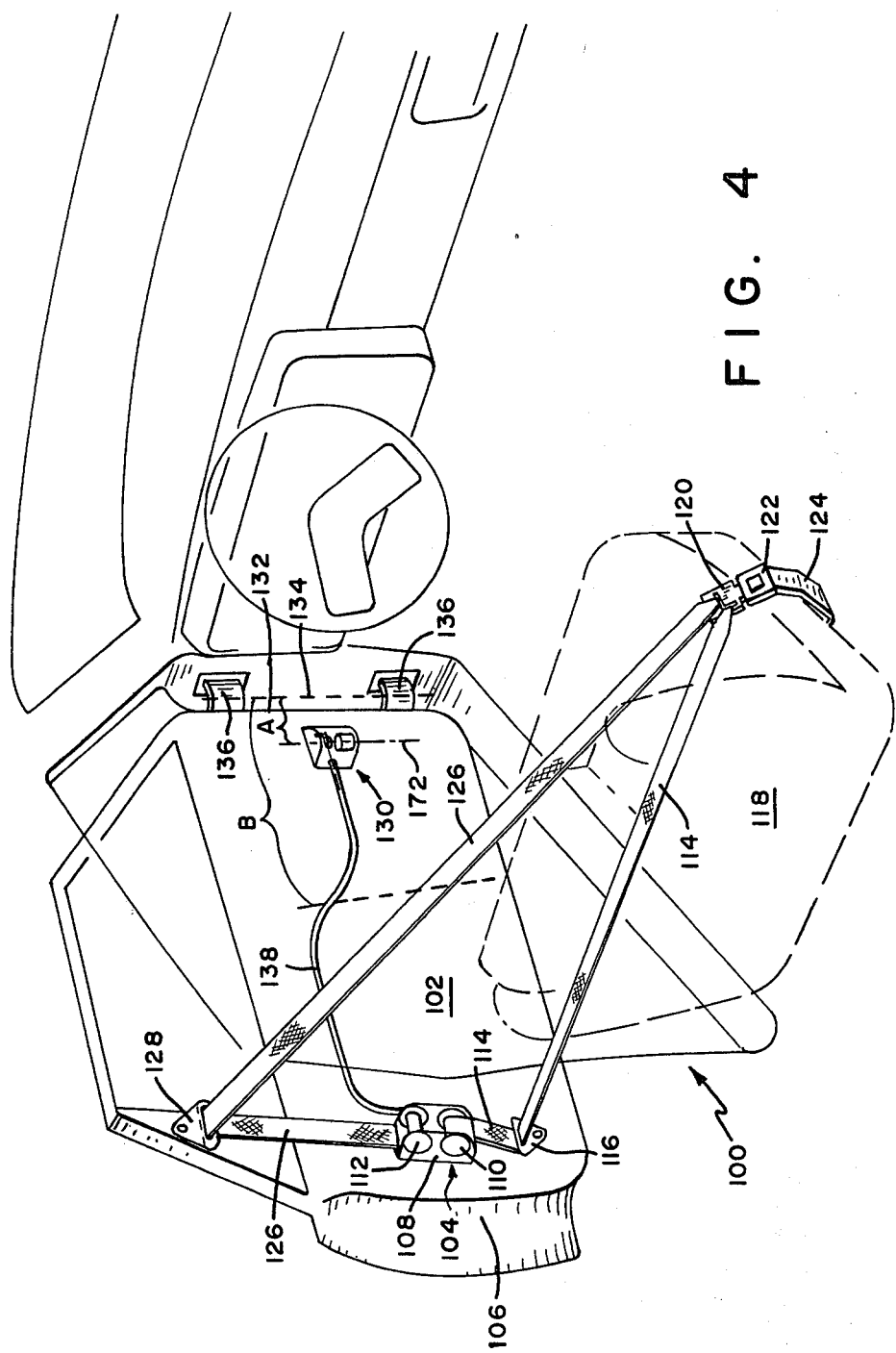
FIG. 4 is a perspective view of another embodiment of the seat belt system of this invention.

In accordance with a preferred embodiment of this invention as shown in FIG. 1, a passive seat belt system generally indicated at 10 is provided in the vehicle having door 12 and an adjacent seat 14, shown as the driver's seat. The system may obviously be employed with a passenger's seat.

Fixedly mounted on door 12 is a retractor mechanism generally indicated at 16. Retractor mechanism 16 is shown in the form of a dual spool retractor housed within a single U-shaped housing 18, and includes a lap belt retractor spool 20 mounted in the lower portion of housing 18 and a shoulder belt retractor spool 22 mounted above spool 20. It should be noted that a dual spool retractor is illustrated as one means of providing a 3-point passive seat belt system but that a single retractor may alternately be employed for either a 3-point or a 2-point system. Extending from retractor 20 is conventional seat belt webbing 24 which extends substantially horizontally on the lower portion of door 12 to a conventional web guide 26 mounted adjacent the rearward end of door 12. Web guide 26 is provided with a slotted opening through which seat belt webbing 24 extends. The end of webbing 24 opposite spool 20 extends across the lap portion of seat 14 to a tongue portion 28 of a buckle and tongue assembly located on the inboard side of seat 14. Lap belt webbing 24 is fixedly attached to tongue 28 by sewing or other means. Tongue 28 is releasably interconnected with buckle 30 mounted by anchor 32 to the floor of the vehicle adjacent the inboard side of seat 14. The buckle and tongue assembly provides an emergency release mechanism and need not be present if alternate release mechanisms are provided elsewhere (e.g., within retractor 16) or are not desired.

Extending from spool 22 also horizontally on door 12 is shoulder belt webbing 34. Shoulder belt webbing 34 extends to a second slotted web guide 36 located slightly more rearwardly on door 12 than guide 26, thence through guide 36 upwardly to a third slotted web guide 38 attached to a rearward portion of the window frame of door 12. The height of guide 38 on door 12 is chosen so as to be above the height of the shoulder of an occupant in seat 14. A reinforcement plate 40 may be provided on door 12 to strengthen the support during loading situations. Shoulder belt webbing 34 extends downwardly from guide 38 to tongue 28 where it is likewise fixedly attached by sewing or the like. Thus, a 3-point passive seat belt system is provided with lap and shoulder belt restraints, with lap and shoulder belt webbing 24 and 34 being extendable from and retractable onto their respective spools 20, 22 in a conventional manner.

Door 12 is mounted to the vehicle adjacent its front end 42 by one or more door hinges 44 in a conventional manner. Retractor housing 18 is mounted on door 12 adjacent forward end 42.

Referring now to FIGS. 2 and 3, retractor 16 is shown in more detail. Retractor spools 20, 22 are rotatably mounted in a vertical direction in frame 18. Each spool is connected to a rewind spring 46, 48 which normally urges webbing 24, 34 onto spools 20, 22 in a rewind direction. Located beneath spool 20 is a sensor shown in the form of an conventional weighted pendulum 50 which is responsive to vehicle decelerations or accelerations. Pendulum 50 is suspended from support 52 mounted in housing 18 by its cap 54 so as to be pivotable in all directions. A pawl member 56 is pivotably mounted in housing 18 and one portion 58 is in contact with pendulum cap 54. Another portion 60 of pawl 56 extends upwardly from portion 58 and includes a C-shaped opening 62. A lock dog 64 is pivotably mounted via ears in the legs of a U-shaped frame 66 surrounding lap belt spool 20. Snap fitted over the rearward end of lock dog 64 is a plastic member 63 having legs 65, 67 pivotably mounted in frame 66. One end 68 of leg 65 that extends through frame 66 is in engagement with opening 62 of pawl 56. Lock dog 64 includes locking edges 70, 72. Locking edge 70 is adapted to engage with the ratchet teeth of a ratchet wheel 74 affixed to one side of spool 20. A second ratchet wheel 76 is provided on the other side of spool 20 and third ratchet wheel 78 is affixed to and rotatable with the lower end of spool 22. Locking edge 72 of lock dog 64 is adapted to engage the ratchet teeth of both ratchet wheels 76 and 78. When lock dog 64 is triggered, the engagement of its locking surfaces with the ratchet teeth of ratchet wheels 74, 76 and 78 prevents further extraction rotation of retractor spools 20, 22 and thus locks up the retractor. It should be noted that the pivotable action of pendulum 50 results in an uplifting of cap 54, thereby lifting pawl 56. This lifting motion is translated via opening 62 and leg 65 to a rotatory motion on lock dog 64 and consequent engagement with the ratchet teeth of ratchet wheels 74, 76 and 78.

If desired, a comfort mechanism feature may be provided as shown in copending Application Ser. No. 149,616, filed May 14, 1980 to reduce the rewind force of the shoulder belt retractor and to reduce the door opening forces. The disclosure of such copending application is expressly incorporated herein by reference.

The design features of the sensor member are chosen so that pendulum 50 is actuated to its lock position upon a predetermined acceleration or deceleration level of the pendulum, which would occur in a rapid braking or a collision of the vehicle. For example, the sensor may be designed in a conventional manner to provide actuation in the event of a deceleration or acceleration of no more than 0.7 "g" ("g" being the force of gravity), as is typical in vehicles manufacured in the United States. The center of gravity of pendulum 50 is shown as line 80 in FIG. 2. The distance between line 80 (also shown in FIG. 1) and the hinge point 82 of door 12 is indicated as X in FIG. 1.

Retractor housing 18, and hence pendulum 50, is mounted adjacent to front end 42 of door 12. By locating the pendulum 50 as close as possible to the hinge point 82 of door 12, it can be assured that with a normal attitude of the vehicle, the resultant acceleration acting on pendulum 50 due to door opening or closing motion will be less than the lock up deceleration or acceleration value. It is preferred to locate retractor 16 adjacent to the front edge of door 12 for such reasons. In almost all cases, if the sensing mechanism is located at the forward quarter section of the door, this will insure the desired result with normal door opening motion. For vehicles with lighter doors, it is preferred to mount the sensor at the forward one-fifth of the door. Preferably, the location of the sensor on the door is chosen so that the resultant acceleration acting on the sensor due to door opening motion is less than about 0.4 g.

Since the resultant acceleration on the sensor when opening the door is proportional to the distance from the hinge point to the sensor mechanism, it can be seen that at a distance Y from the hinge point, which is greater than the distance X, the acceleration on the sensor due to door opening motion could equal the lock up acceleration, thereby preventing further opening of the door.

The operation of the system shown in FIG. 1 is self evident. Assuming that door 12 is closed and an occupant is seated in seat 14, prior to egressing from the vehicle, the occupant opens door 12. Retractor spools 20 and 22 pay out additional webbing which permit full door opening. The acceleration on pendulum 50 is reduced below the threshhold level of lock up in view of its forward location. Upon entering the vehicle, the occupant closes door 12 and excess webbing for the lap belt and shoulder belt are taken up by spools 20, 22, whereby the belts extend across the pelvic and shoulder regions of the occupant when seated in seat 14. It should be noted that even if pendulum member 50 is actuated during the door closing motion, since the ratchet wheels are designed to ratchet over the lock dog in the rewind direction, full rewind motion of the seat belts is possible. By releasing the emergency release buckle 30, the occupant can quickly egress from the vehicle in an emergency situation.

It should be noted that the present system may likewise be utilized as an active seat belt system and that the occupant can connect the tongue and buckle assembly as in a normal active seat belt system. When the seat belt is not in use, the seat belts are stowed neatly on door 12.

A second embodiment of the present invention is shown in FIGS. 4–7. In this system, generally indicated at 100, only the vehicle sensor is located in the forward portion of the door. System 100 includes a dual spool retractor 104 mounted adjacent rearward end 106 of door 102. Retractor 104 includes a housing 108 having a generally U-shape in which are rotatably mounted lap belt spool 110 and shoulder belt spool 112. Lap belt webbing 114 extends from spool 110, through slotted web guide 116 mounted on a lower portion of door 102 and across seat 118 to tongue portion 120 of a tongue and buckle assembly. Buckle 122 is located on the inboard side of seat 118 and is anchored to the floor of the vehicle by anchor 124. Shoulder belt webbing 126 extends from spool 112 upwardly towards and through a second slotted web guide 128 mounted on the rearward portion of the window frame of door 102 and thence towards tongue 120 at which it is likewise fastened by sewing or the like. A sensor mechanism generally indicated at 130 is mounted on the forward portion of door 102 adjacent forward end 132 and hinge point 134 of hinge(s) 136 by which door 102 is connected to the vehicle frame in a conventional manner. A cable mechanism 138 links sensor 130 and retractor 104.

FIG. 5 is a somewhat schematic view of the sensor-retractor assembly. Sensor 130 is in the form of a conventional weighted pendulum 140 and is suspended by its cap 142 from a support 144 provided in sensor housing 146 which is fixedly mounted on door 102. Pawl 148 is pivotably mounted on housing 146 and includes one arm 150 in contact with pendulum cap 142 and a second arm 152 extending upwards from arm 150. Second arm 152 is provided with an opening 154 through which one end of cable 138 extends. Cable 138 is contained within a sheath 156 which extends within the interior of door 102. The opposite end of cable 138 is connected to an opening 158 in a link 160 rigidly attached to a conventional lock dog 162 pivotably mounted in retractor frame 108. Lock dog 162 is provided with opposite locking surfaces 164, 166 which are engageable with the ratchet teeth (not shown) of ratchet wheels 168, 170 that are fixed for rotation respectively with spools 110 and 112.

When pendulum 140 is actuated at the predetermined level of deceleration or acceleration, pendulum cap 142 lifts pawl 148 about its pivot axis thereby rotating leg 152 in a clockwise direction as viewed in FIG. 5. As a result, cable 138 is pulled away from retractor frame 108 resulting in a pivotable motion of link 160 in a clockwise direction (FIG. 7) whereby lock dog 162 is pivoted to its dotted line positions (FIGS. 6 and 7) to engage ratchet wheels 168 and 170. As a result, the retractor spools are locked against further extraction rotation.

As with the embodiment of FIGS. 1 and 2, sensor 130 is located adjacent to the front end of door 102 whereby the distance "A" between the center line 172 of pendulum 140 and hinge point 134 is less than the distance "B" between the hinge point 134 and a point on door 102 at which the sensor would theoretically actuate as a result of door acceleration resulting from normal door opening. Consequently, door 102 may be opened without locking up spools 110 and 112.

It is to be noted that any suitable vehicle acceleration or deceleration sensor may be employed in the present invention. Rather than a weighted pendulum, the sensor may take the form of a ball and cup, an inverted pendulum, etc.

It is to be understood that variations and modifications of the present invention may be made without departing from the scope thereof. It is also to be understood that the present invention is not to be limited by the specific embodiments disclosed herein but only in accordance with the appended claims when read in light of the foregoing specification.

What is claimed:

1. A passive seat belt system provided in a vehicle having a door adjacent to a vehicle seat, said door having a forward end hingedly connected at a hinge point to the vehicle frame, said system comprising:
    at least one retractor mechanism fixedly mounted on said door;
    a seat belt restraint having one end connected to said retractor mechanism and an opposite end attached to said vehicle at a position located on the inboard side of said seat, said restraint being movable towards and away from said retractor, said restraint providing a safety restraint for an occupant seated in said seat when said door is closed; and
    a sensor operatively associated with said retractor mechanism and operable upon sensing a deceleration or acceleration of said vehicle above a predetermined amount to lock said retractor mechanism and prevent motion of said restraint away from said retractor mechanism, at least said sensor being mounted at a position on said door adjacent said one end of one door, said position being located no further from the hinge point of said door than a predetermined distance at which the "g" forces associated with the opening of said door are less than said predetermined amount of deceleration or acceleration, whereby said sensor is not actuated to lock said retractor mechanism upon normal opening motion of said door.

2. The passive seat belt system of claim 1 wherein said sensor is mounted in said retractor mechanism, said retractor mechanism being mounted on said door at said position.

3. The passive seat belt system of claim 1 wherein said retractor mechanism is mounted on said door at a location separate from said sensor.

4. The passive seat belt system of claim 2 or 3 wherein said sensor comprises a weighted pendulum.

5. The passive seat belt system of claim 2 or 3 wherein said retractor mechanism comprises a dual spool seat belt retractor including separate spools for winding up and permitting extraction of lap belt webbing and shoulder belt webbing.

6. The passive seat belt system of claim 1 including means to release said seat belt restraint from a position surrounding said seat.

7. The passive seat belt system of claim 6 wherein said release means comprises a releaseable tongue and buckle assembly, said tongue being connected to said seat belt restraint and said buckle being positioned in said vehicle on the inboard side of said seat.

8. The passive seat belt system of claim 1 wherein said sensor is mounted on said door at a position within the first quarter length of said door as measured from the forward edge thereof adjacent to said hinge point.

9. The passive seat belt system of claim 4 including pawl means mounted in said retractor and liftable in response to actuation of said pendulum and means to translate said lifting motion of said pawl to a rotating motion to actuate locking of said retractor.

10. The passive seat belt system of claim 9 wherein said retractor comprises at least one ratchet wheel and including a lock dog rotatably mounted in said retractor and engageable with said ratchet wheel to lock said retractor in response to said rotating motion.

11. The passive seat belt system of claim 10 wherein said retractor mechanism comprises a dual spool retractor including separate spools for winding up and permitting extraction of lap belt webbing and shoulder belt webbing, said spools being mounted vertically with respect to each other, and at least one ratchet wheel mounted on each of said spools, said lock dog being engageable with said ratchet wheel of each spool to lock both spools.

12. The passive seat belt system of claim 3 including cable means operatively connecting said sensor and said retractor mechanism whereby said retractor mechanism is locked in response to actuation of said sensor.

13. The passive seat belt system of claim 12 wherein said sensor comprises a weighted pendulum mounted in a housing, pawl means mounted in said housing and movable in response to actuation of said pendulum, said pawl means being in communication with said cable means.

14. The passive seat belt system of claim 13 wherein said retractor mechanism comprises at least one ratchet wheel and a pivotable lock dog engageable with said ratchet wheel to lock said retractor, said lock dog being in operative communication with said cable means whereby said movement of said pawl means results in pivoting of said lock dog to lock said retractor.

15. The passive seat belt system of claim 14 wherein said retractor mechanism comprises a dual spool retractor including separate winding mechanisms for lap belt and shoulder belt webbing, at least one ratchet wheel associated with each of said separate winding mechanisms, said lock dog being engageable with said ratchet wheels of said separate winding mechanisms to lock the same.

16. The passive seat belt system of claim 15 wherein said retractor mechanism is mounted on said door adjacent its rearward edge.

17. The passive seat belt system of claim 1 wherein said sensor is mounted on said door at a position such that the resultant acceleration due to normal door opening motion does not exceed about 0.4 g.

* * * * *